United States Patent

[11] 3,619,597

| [72] | Inventor | Charles Adler, Jr.<br>1506 Sutton Pl. Apt., 1111 Park Ave.,<br>Baltimore, Md. |
|---|---|---|
| [21] | Appl. No. | 28,908 |
| [22] | Filed | Apr. 15, 1970 |
| [45] | Patented | Nov. 9, 1971 |

[54] STREAMLINED GAS DISCHARGE ANTICOLLISION AIRCRAFT BEACON
3 Claims, 5 Drawing Figs.

[52] U.S. Cl.................................................. 240/7.7,
240/51.11, 240/51.12, 340/25
[51] Int. Cl...................................................... B64d 47/02
[50] Field of Search........................................... 240/7.7,
7.25, 8.2, 7.1 E, 51.11, 51.12, 104, 105, 109, 110,
41, 37; 340/25, 87, 105, 84

[56] References Cited
UNITED STATES PATENTS
1,799,341 4/1931 Wiegand..................... 240/51.12 UX

| 2,337,744 | 12/1943 | Garstang..................... | 240/7.7 |
| 2,538,681 | 1/1951 | Gangbin...................... | 240/51.12 |
| 2,748,371 | 5/1956 | Wilcox et al................. | 340/25 |
| 3,504,339 | 3/1970 | Bailey......................... | 340/84 |

Primary Examiner—Louis J. Capozi
Attorney—Cushman, Darby & Cushman

ABSTRACT: A streamlined gas discharge, anticollision aircraft beacon for high-speed aircraft which is adapted for mounting on an external portion of the aircraft and which includes an elongated concave trough reflector mounted adjacent to a gas discharge tube which can be excited to provide a stroboscopic light. The reflector and gas discharge tube are mounted relative to each other so as to provide a light field of 360° in a horizontal plane and of at least 140° in a vertical direction. A tear drop or oval-shaped light transmitting cover over the reflector and discharge tube provides extremely low aerodynamic drag, particularly when utilized with high-speed aircraft. A second embodiment of the beacon provides a light field of at least 180° in the vertical direction.

PATENTED NOV 9 1971 3,619,597

STROBE FLASHING CIRCUITRY

INVENTOR
CHARLES ADLER, JR.

BY Cushman, Darby & Cushman
ATTORNEYS

INVENTOR
CHARLES ADLER, JR.

STREAMLINED GAS DISCHARGE ANTICOLLISION AIRCRAFT BEACON

The present invention relates to aircraft anticollision lights and more particularly to a streamlined, gas discharge anticollision beacon for high-speed aircraft.

For many years it has been the practice to employ incandescent lamps in streamlined assemblies to provide running lights for aircraft. However, the use of incandescent lamps has necessitated an excessive or abrupt interruption in the smooth exterior surface of the aircraft because of the configuration of the lamp. Furthermore, these incandescent running lights have not provided the these incandescent running lights have not provided the extremely desirable hourglass of a light field which covers 360° in a horizontal plane. More recently, anticollision stroboscopic lights have been developed which utilize circular xenon flash tubes which surround an hourglass reflector to provide 360° of horizontal light coverage. However, with the increased popularity of high-speed aircraft the xenon lights have not provided the necessary streamlined configuration so as to provide a minimum of aerodynamic drag. Furthermore, in addition to creating problems with respect to aerodynamic drag, the xenon lamps have been provided with circular flash tubes which do not provide the amount of light that is provided by the elongated gas tube and reflector of this invention.

Accordingly, the general purpose of this invention is to provide a streamlined, gas discharge, anticollision aircraft beacon which embraces all the advantages of similarly employed beacons and possesses none of the aforedescribed disadvantages. To accomplish this the present invention utilizes a unique arrangement of an elongated concave trough reflector in conjunction with a gas discharge tube whereby the light field of 360° in a first or horizontal plane is provided and wherein the light field extends at least 140° in a direction (vertical) perpendicular to the first or horizontal plane. The aircraft beacon of this invention is also streamlined and of substantially teardrop or oval shape so as to provide extremely low aerodynamic drag on high-speed aircraft while at the same time the elongated configuration of the gas discharge tube and of the reflector provides substantially more light than heretofore known light arrangements.

An object of the present invention is the provision of a streamlined, elongated gas discharge, anticollision aircraft beacon which provides a sufficient light field of 360° in a first or horizontal plane and of at least 140° in a direction perpendicular to said first plane while causing a minimum aerodynamic drag on high-speed jet aircraft.

A further object of the invention is the provision of such an aircraft beacon which provides a light field of at least 180° in a substantially vertical direction.

Other objects and features of the invention will become apparent to those of ordinary skill in the art as the disclosure is made in the following description of a preferred embodiment of the invention as illustrated in the accompanying drawings in which.

Figure 1:
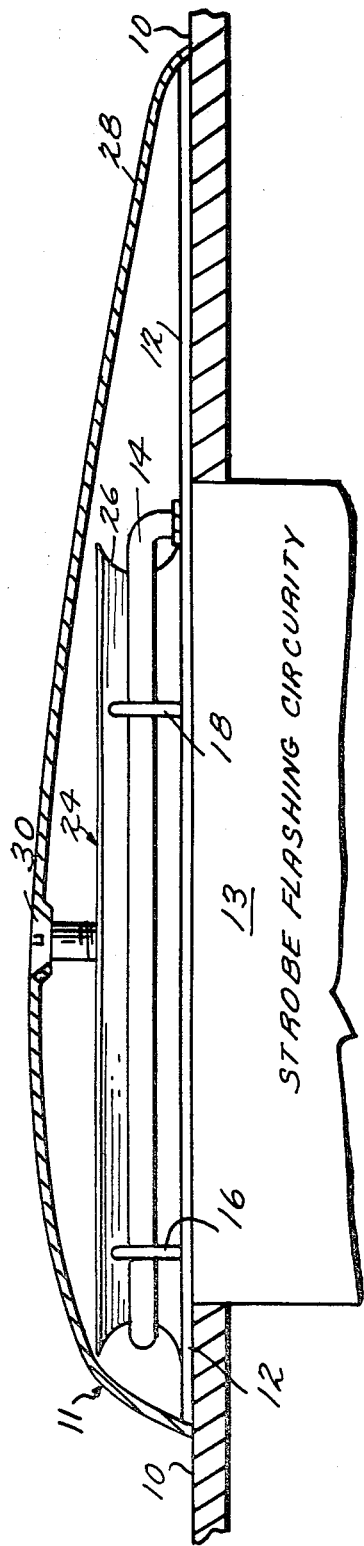
FIG. 1 is a partially sectioned view of a side elevation of the beacon of this invention and circuitry mounted on an aircraft.
Figure 2:
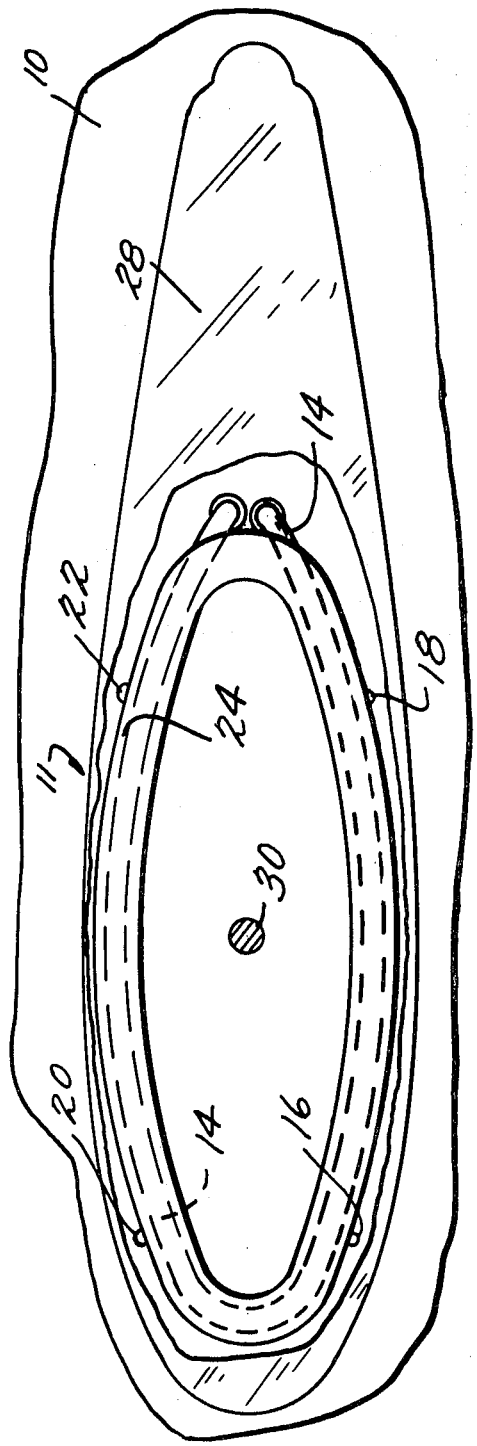
FIG. 2 is a top plan view of the apparatus shown in FIG. 1.

With reference now to the drawings, wherein like reference characters designate like or corresponding parts throughout the several views, there is shown in FIGS. 1 and 2 the exterior surface 10 of an aircraft on which is flush mounted an anticollision beacon 11. Secured to base 12 of the beacon is a conventional flashing circuit arrangement 13 for providing stroboscopic illumination of gas discharge means or tubular member 14 which extends in a horizontal plane in a generally elongated oval or elliptic shape returning back to itself and turning downward at right angles for coupling at its adjacent ends in a conventional manner to the flashing circuitry through apertures and grommets or the like if desired in base 12. Tube 14 is spacedly mounted above base 12 by means of conventional standards or bracket members 16, 18, 20 and 22, for example.

An elongated, substantially oval- or elliptic-shaped concave trough reflector 24, for example of aluminum is mounted in a conventional manner to base 12 with its continuous, endless outer concave surface 26 adjacent the gas discharge tube 14. Surface 26 may be of any desired concave shape, for example parabolic, elliptical, spherical or the like, and the back side opposite thereto is preferably correspondingly convex. A streamlined, teardrop-shaped light transmitting cover or lens 28, preferably of molded plastic, is conventionally attached as by screw 30 to base 12 so as to cover the base, reflector 24 and tube 14.

Figure 3:
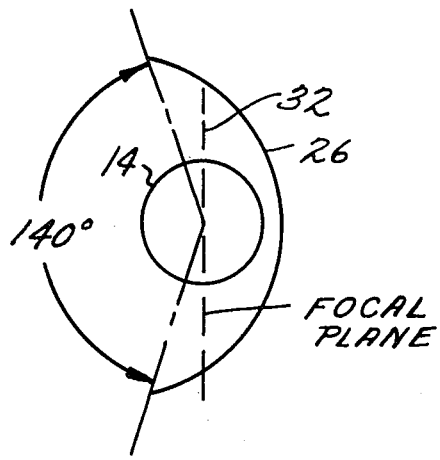
FIG. 3 is a diagrammatic view showing one gas tube and reflector relationship.
Figure 4:
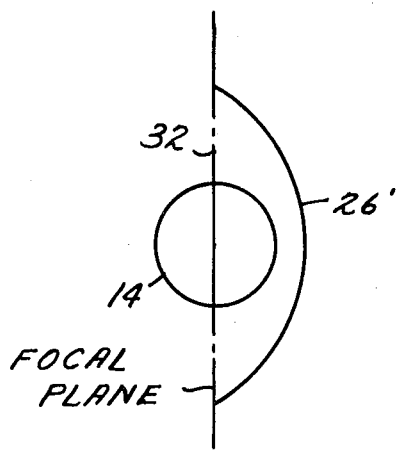
FIG. 4 is another such diagrammatic view showing a different relationship between the gas tube and reflector.

In the embodiment illustrated in FIGS. 1 and 2 and as diagrammatically indicated in FIG. 3, gas discharge tube 14 is located in the focal plane 32 of the concave surface 26 of reflector 24 with the outer ends of surface 26 extending up to 20° beyond plane 32 so that a light field in a substantially vertical direction is created over at least 140° when the gas is excited within the tube. If desired, the tube may extend slightly beyond the confines of the reflecting surface in order to obtain the 140° or greater vertical light field. The light field also covers 360° in a substantially horizontal direction since the tube surrounds the reflector. In the variation diagrammatically illustrated in FIG. 4, tube 14 is also located in the focal plane 32 but protrudes beyond the ends of the reflecting concave surface 26 since those ends terminate on the focal plane. In this case, at least a 180° light field is generated in a substantially vertical direction. When the gas tube protrudes beyond the confines of the reflector, the light field is composed of direct as well as reflected light.

Figure 5:
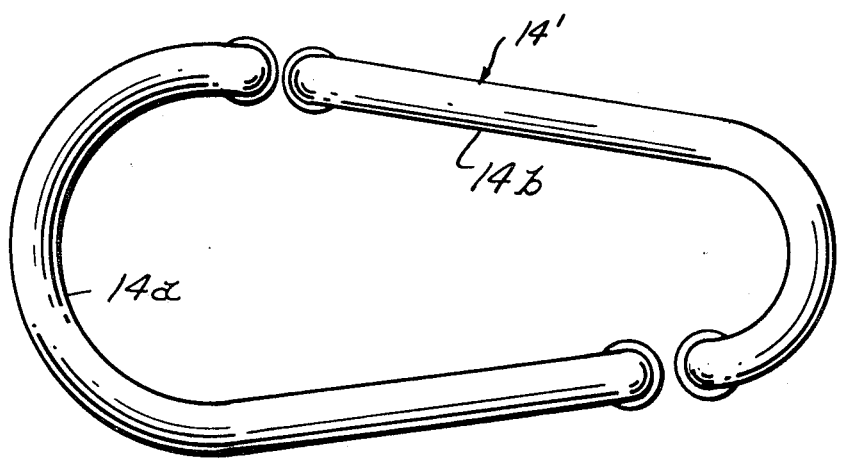
FIG. 5 shows a dual section gas tube in another oval shape useful in this invention.

As shown in FIG. 5, the gas discharge tube 14' may be in separate independent sections, for example two sections 14a and 14b, electrically connected to the aforementioned strobe flashing circuitry in parallel so if one section fails the remainder will continue to give signal illumination. At the same time the failure can be recognized by tower controllers or maintenance men and readily remedied on the ground. As a further safety feature, if desired the electronics in the strobe flashing circuitry, which is preferably solid state, may be duplicated and connected to the respective tube sections 14a and 14b.

FIG. 5 also illustrates another oval configuration, which is of the egg or teardrop shape, for the gas discharge tube. For this embodiment, the light transmitting cover (not shown, but see cover 28 in FIG. 1) may generally be the same shape as tube 14' with or without an extended tapering tail section beyond tube section 14b.

In any embodiment of this invention, the light transmitting cover or lens may itself be colored or clear, while the tube gas is the opposite. For example, in order to distinguish the transmitted beacon light from the moon or stars, the cover may be colored (e.g., aviation red) and the gas white xenon. On the other hand, the gas in the discharge tube may provide the color (e.g., neon) for a clear or colorless cover.

The construction of the beacon of this invention, especially its elongated shape, allows the height of cover 28 above the aircraft skin 10 to be minimal, for example 1 inch to 1½ inches, while still providing for sufficient beacon light transmission for all types of aircraft whether mounted on the top or bottom of the fuselage, atop the vertical stabilizer, etc. The resulting low, streamlined oval shape of the beacon substantially reduces or eliminates the aerodynamic drag on high-speed jet aircraft caused by prior beacons of the taller, upright cylinder type utilizing circular gas tubes and hourglass reflectors.

In the operation of the beacon of this invention, the conventional flashing circuitry located beneath the external surface 10 of the aircraft is caused to excite the gas in the gas discharge tube. The excitation of the gas generates light in a known manner which together with the reflected light from reflector 24 provides a light field which covers 360° in a substantially horizontal plane and which covers at least 140° in a substantially vertical direction. Because of the low, teardrop shape of cover 28 the beacon creates a very low aerodynamic drag even on very high-speed aircraft, of jet speeds and upward, and the streamlined shape of the cover 28 enables the use of an elongated concave reflector 24 together with an elongated gas discharge tube so that additional light is provided by the added dimensions of the tube and the reflector as compared with similar beacons which are characterized by circular tubes and reflectors. Besides the additional light as anticollision aid, further safety can be obtained when a multiple section flashing gas tube is employed as in FIG. 5.

Thus, the streamlined, gas discharge anticollision beacon of this invention provides for a highly visible light and also provides for a streamlined configuration which is particularly adaptable for use with modern high-speed aircraft whereby the aerodynamic drag created by the beacon is extremely low as compared with similar prior art beacons.

Obviously many modification and variations of the present invention are possible in light of the above teachings. It is therefore to be understood that within the scope of the appended claims the invention may be practiced otherwise than as specifically described.

What is claimed is:

1. A streamlined, gas discharge, anticollision aircraft beacon for mounting on an external portion of an aircraft, comprising:
   an elongated oval-shaped concave trough reflector having an outer concave reflecting surface defining a focal plane;
   a similarly shaped gas discharge tube means surrounding said reflector for providing a light field of 360° in a first plane, the plane in which said reflector is oval shaped;
   means positioning said gas discharge tube means in said focal plane for providing a light spread of at least 140° in a direction perpendicular to said first plane, the direction with respect to which said reflecting surface is concave; and
   a streamlined light-transmitting cover over said reflector and tube means, having an elongate shape in said plane simulating that of the gas discharge tube, the light-transmitting cover progressively decreasing in cross-sectional area in said direction, and said cover being longer in said plane than thick in said direction.

2. An aircraft beacon as in claim 1 wherein said tube means protrudes beyond the confines of said reflector sufficiently to provide a light field of at least 180° in said perpendicular direction.

3. An aircraft beacon as in claim 1 for use with lighting circuitry for stroboscopically flashing said gas discharge tube means, wherein said tube means comprises a plurality of separate gas discharge tubes for independent operation by said lighting circuitry.

* * * * *